United States Patent
Motokawa et al.

(10) Patent No.: US 10,401,069 B2
(45) Date of Patent: Sep. 3, 2019

(54) AIR-CONDITIONING APPARATUS FOR VEHICLE

(71) Applicant: Mitsubishi Electric Corporation, Chiyoda-ku, Tokyo (JP)

(72) Inventors: Tarou Motokawa, Tokyo (JP); Hidetaka Adachi, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 123 days.

(21) Appl. No.: 14/781,870

(22) PCT Filed: Nov. 26, 2013

(86) PCT No.: PCT/JP2013/081722
§ 371 (c)(1),
(2) Date: Oct. 1, 2015

(87) PCT Pub. No.: WO2014/174715
PCT Pub. Date: Oct. 30, 2014

(65) Prior Publication Data
US 2016/0033185 A1     Feb. 4, 2016

(30) Foreign Application Priority Data

Apr. 25, 2013   (JP) .................. 2013-092273

(51) Int. Cl.
*F25B 49/02*     (2006.01)
*B60H 1/00*      (2006.01)
(Continued)

(52) U.S. Cl.
CPC ......... *F25B 49/02* (2013.01); *B60H 1/00371* (2013.01); *B60H 1/00535* (2013.01);
(Continued)

(58) Field of Classification Search
CPC .. B60H 1/00371; B60H 1/00535; B60H 1/00; B60H 1/00521; B60H 1/3204; B60H 2001/00235; B61D 17/12
(Continued)

(56) References Cited

U.S. PATENT DOCUMENTS 3,584,888 A * 6/1971 Lott ................ F16L 5/10
174/153 G
3,841,108 A * 10/1974 Pierrat ............. B60H 1/3222
62/236
(Continued)

FOREIGN PATENT DOCUMENTS

DE   44 05 774 C1   8/1995
JP   59-21933 Y2    6/1984
(Continued)

OTHER PUBLICATIONS

Office Action (Notice of Reasons for Rejection) dated Mar. 15, 2016, by the Japanese Patent Office in corresponding Japanese Patent Application No. 2015-513485 and English translation of the Office Action. (5 pages).
(Continued)

*Primary Examiner* — Henry T Crenshaw
(74) *Attorney, Agent, or Firm* — Buchanan Ingersoll & Rooney PC (57) ABSTRACT

An air-conditioning apparatus for a vehicle includes a casing that an air inlet which communicates with an opening formed in a roof of a vehicle and through which air in the vehicle is formed in, and an apparatus main body that is installed in the casing and conditions the air, in the vehicle, which is sucked through the air inlet. A wiring through hole for passing a wiring cable extending from the apparatus main body through a space between the roof of the vehicle and the casing is formed in a bottom plate of the casing. The wiring cable is disposed so as to be passed through the space
(Continued)

between the bottom plate and the roof of the vehicle via the wiring through hole from the apparatus main body and to extend into the opening from a position that is in the bottom plate and above the opening of the vehicle.

4 Claims, 9 Drawing Sheets

(51) Int. Cl.
  *B61D 17/12* (2006.01)
  *B61D 27/00* (2006.01)
(52) U.S. Cl.
  CPC ......... *B61D 17/12* (2013.01); *B61D 27/0018* (2013.01); *B60H 2001/00235* (2013.01)
(58) Field of Classification Search
  USPC .................................................. 62/239, 244
  See application file for complete search history.

(56) References Cited

U.S. PATENT DOCUMENTS

| | | | | |
|---|---|---|---|---|
| 3,885,398 | A * | 5/1975 | Dawkins | B60H 1/3204 62/228.1 |
| 4,201,064 | A * | 5/1980 | Krug | B60H 1/00371 62/239 |
| 4,307,436 | A * | 12/1981 | Eckart | H02B 1/50 174/38 |
| 4,318,350 | A * | 3/1982 | Skypala | B61D 17/12 105/397 |
| 4,321,745 | A * | 3/1982 | Ford | E04D 13/1407 126/623 |
| 4,475,687 | A * | 10/1984 | Schulz | B60H 1/00371 165/77 |
| 4,672,818 | A * | 6/1987 | Roth | B60H 1/00364 62/239 |
| 5,005,372 | A * | 4/1991 | King | B60H 1/00371 62/244 |
| 5,220,808 | A * | 6/1993 | Mayer | B60H 1/00371 62/244 |
| 5,605,055 | A * | 2/1997 | Salgado | B60H 1/00371 62/244 |
| 5,861,576 | A * | 1/1999 | Langston | H02G 3/105 174/481 |
| 6,109,216 | A * | 8/2000 | Reynolds | F24H 9/1836 122/13.01 |
| 6,503,458 | B1 * | 1/2003 | Ogle | A61L 9/12 422/120 |
| 2002/0015565 | A1 * | 2/2002 | Imamura | H04B 10/806 385/88 |
| 2002/0157565 | A1 * | 10/2002 | Norton | B61D 17/005 105/404 |
| 2014/0250800 | A1 * | 9/2014 | Hirashima | B61D 17/12 52/45 |

FOREIGN PATENT DOCUMENTS

| | | | |
|---|---|---|---|
| JP | 60-178274 U | | 11/1985 |
| JP | 05-016654 A | | 1/1993 |
| JP | H07-332758 | * | 7/1995 |
| JP | 07-332758 A | | 12/1995 |
| JP | 2008-190766 A | | 8/2008 |
| JP | 2012-126351 A | | 7/2012 |
| JP | 2012126351 A | * | 7/2012 |
| JP | 2012-232691 A | | 11/2012 |

OTHER PUBLICATIONS

The extended European Search Report dated Nov. 18, 2016, by the European Patent Office in corresponding European Patent Application No. 13883083.1-1754. (7 pages).
International Search Report (PCT/ISA/210) dated Feb. 18, 2014, by the Japanese Patent Office as the International Searching Authority for International Application No. PCT/JP2013/081722.
Written Opinion (PCT/ISA/237) dated Feb. 18, 2014, by the Japanese Patent Office as the International Searching Authority for International Application No. PCT/JP2013/081722.
Office Action dated Aug. 24, 2016, by the Chinese Patent Office in corresponding Chinese Patent Application No. 201380075950.4, and an English Translation of the Office Action. (10 pages).
Second Office Action dated May 31, 2017 in corresponding Chinese Patent Application No. 201380075950.4, and an English translation thereof (10 pages).
Office Action (Communication pursuant to Article 94(3) EPC) dated Nov. 23, 2018, by the European Patent Office in corresponding European Patent Application No. 13883083.1. (5 pages).

* cited by examiner

AIR-CONDITIONING APPARATUS FOR VEHICLE

TECHNICAL FIELD

The present invention relates to an air-conditioning apparatus for a vehicle mounted on the vehicle.

BACKGROUND ART

An air-conditioning apparatus for a vehicle mounted on a vehicle ceiling of a train or the like has a casing in which a plurality of electric components such as a compressor and a blower are disposed (for example, see Patent Literature 1). Wiring is necessary to connect for supplying driving power to and performing control over these electric components. Many wiring circuits are used for the electric components, and wiring for the main circuit, the control circuit and the like occupies much space inside the air-conditioning apparatus. Furthermore, some air-conditioning apparatuses include a controller, a distribution box, an inverter and the like inside the casing. A wiring cable is laid in all directions inside the casing of the air-conditioning apparatus for a vehicle, and the wiring cable unignorably occupies the space therein.

Conventionally, an air-conditioning apparatus for a vehicle is disclosed in which a wiring pipe duct is provided on the bottom face inside an outdoor part of the air-conditioning apparatus for a vehicle, and the wiring in the wiring pipe duct is connected to a connector for wiring in an end panel part (for example, see Patent Literature 2).

CITATION LIST

Patent Literature

Patent Literature 1: Japanese Unexamined Patent Application Publication No. 2012-126351
Patent Literature 2: Japanese Utility Model Publication No. 59-21933

SUMMARY OF INVENTION

Technical Problem

Herein, in the case of Patent Literature 2, since the wiring pipe duct is provided on the bottom plate of the casing, space for wiring is needed inside the casing and space for passing the wiring in the air-conditioning apparatus is needed, which problematically causes the dimensions of the air-conditioning apparatus to be large. Moreover, there is generally a method in which the wiring is dropped through a ventilation path (return port) to be connected to vehicle wiring. However, the wiring present in the ventilation path problematically causes an increase of ventilation resistance in an air inlet. Furthermore, since the wiring cable is needed to be laid inside the air-conditioning apparatus for a vehicle, the wiring cable causes an obstacle, for example, in cleaning or inspection operation of the indoor heat exchanger. Further, when the wiring is laid in the limited space, workability of assembly is problematically poor.

An object of the present invention is to provide an air-conditioning apparatus for a vehicle capable of making the apparatus small in size and preventing deterioration in workability due to a wiring cable.

Solution to Problem

There is provided an air-conditioning apparatus for a vehicle of the present invention, including a casing that is provided on a roof of a vehicle and that an air inlet through which air in the vehicle is sucked from an opening formed in the roof of the vehicle is formed in, and an apparatus main body that is installed in the casing and conditions the air of the vehicle, which is sucked through the air inlet, wherein a wiring through hole for passing a wiring cable extending from the apparatus main body through a space between the roof of the vehicle and the casing is formed in a bottom plate of the casing, and the wiring cable is disposed so as to be passed through the space between the bottom plate of the casing and the roof of the vehicle via the wiring through hole from the apparatus main body and to extend into the opening from a position that is in the bottom plate of the casing and above the opening of the vehicle.

Advantageous Effects of Invention

According to the air-conditioning apparatus for a vehicle of the present invention, when the wiring cable of the air-conditioning apparatus for a vehicle is connected to a vehicle-side wiring cable on the vehicle side, the wiring cable is routed not through the air inlet but through the space between the bottom plate and the roof of the vehicle toward the opening of the vehicle. Hence, workability in assembling the air-conditioning apparatus for a vehicle and in cleaning or inspection operation of the indoor heat exchanger can be improved. Further, it is unnecessary to secure wiring space in the casing, which can make the apparatus small in size.

DESCRIPTION OF EMBODIMENTS

Embodiment 1

Figure 1:
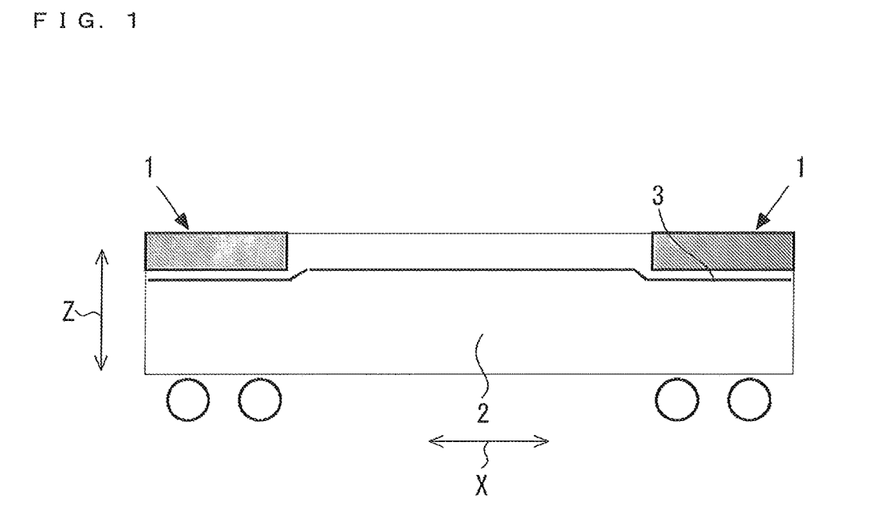
FIG. 1 is a schematic diagram illustrating a vehicle where an air-conditioning apparatus for a vehicle according to Embodiment 1 of the present invention is mounted.
Figure 2:
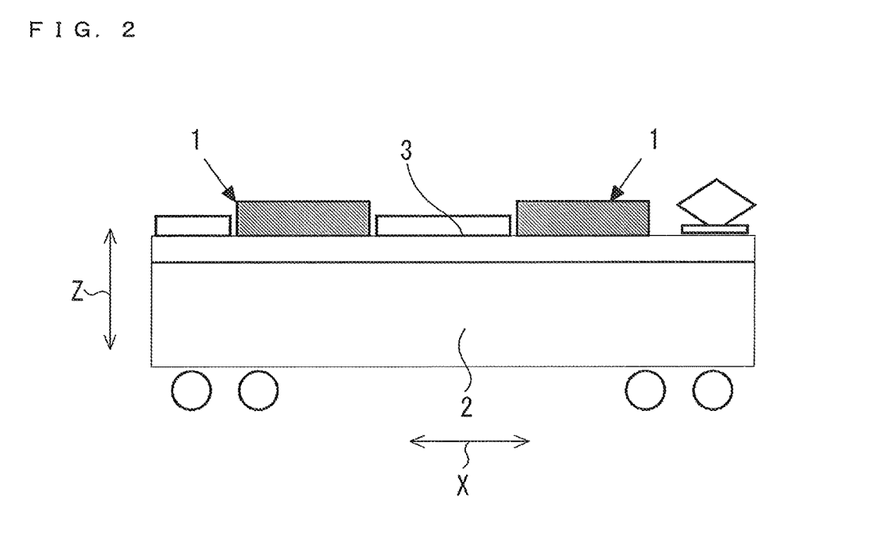
FIG. 2 is a schematic diagram illustrating a vehicle where an air-conditioning apparatus for a vehicle according to Embodiment 1 of the present invention is mounted.

Hereafter, embodiments of an air-conditioning apparatus for a vehicle of the present invention are described with reference to the drawings. FIG. 1 and FIG. 2 are schematic diagrams each of which illustrates a vehicle where the air-conditioning apparatus for a vehicle is mounted. An air-conditioning apparatus 1 for a vehicle is an air-conditioning apparatus, for a vehicle, which is mounted on a roof 3 of a vehicle 2, and is contained in a casing 10 to be fixed onto the roof 3 of the vehicle 2.

Figure 3:
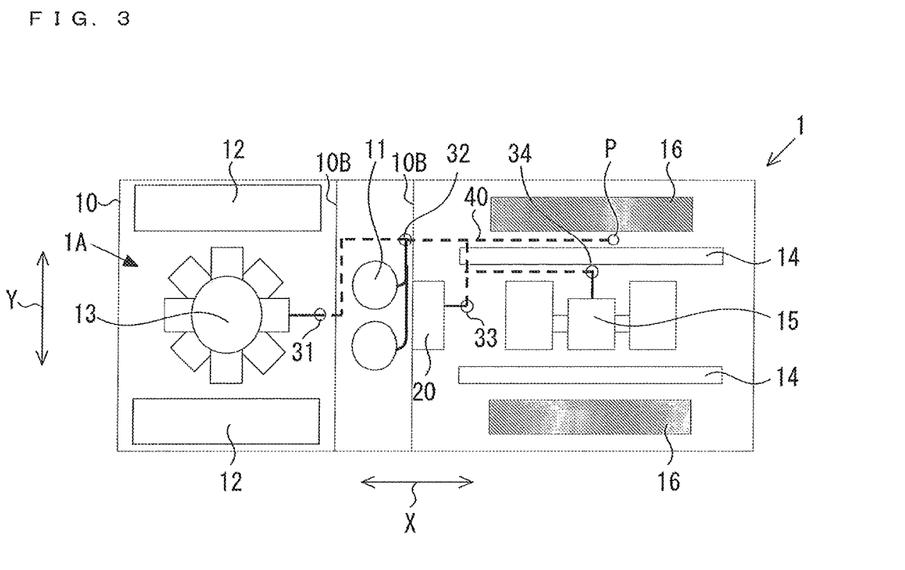
FIG. 3 is a top view exemplarily illustrating the air-conditioning apparatus for a vehicle in FIG. 1.
Figure 4:
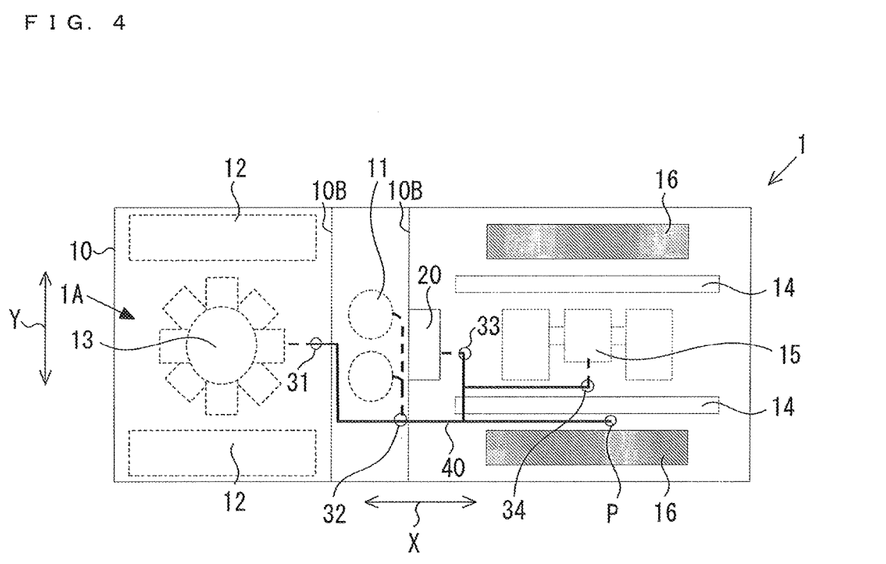
FIG. 4 is a bottom view exemplarily illustrating the air-conditioning apparatus for a vehicle in FIG. 1.
Figure 5:
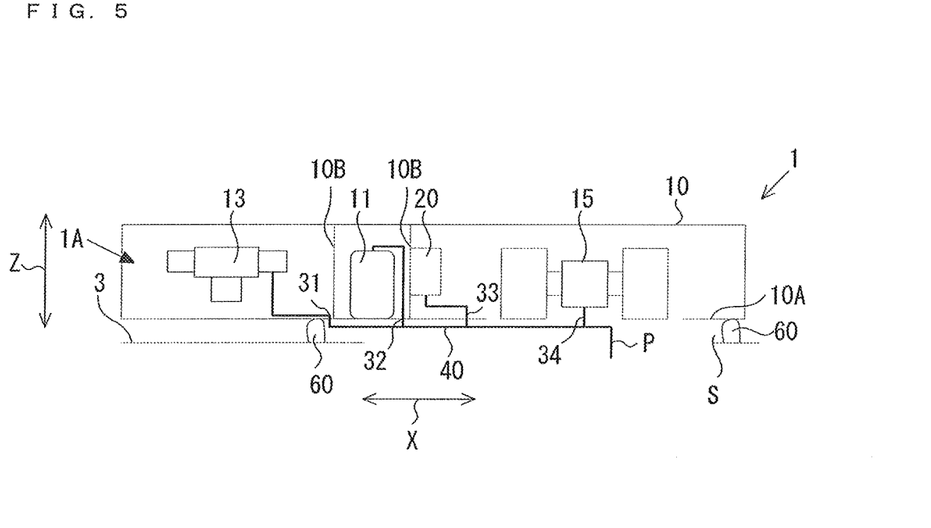
FIG. 5 is a schematic cross-sectional view taken along an X-Z plane to exemplarily illustrate the air-conditioning apparatus for a vehicle in FIG. 1.
Figure 6:
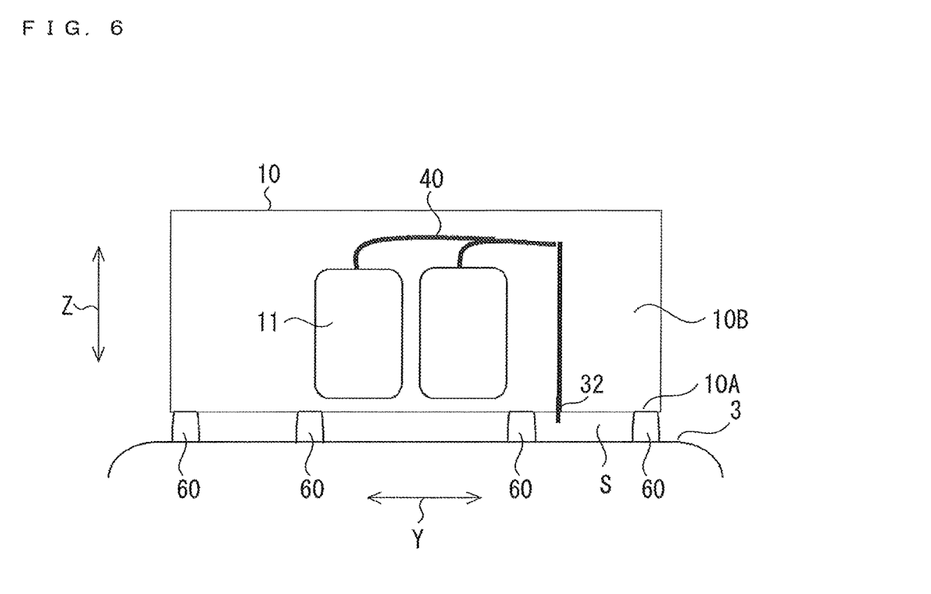
FIG. 6 is a schematic cross-sectional view taken along a Y-Z plane to exemplarily illustrate a compressor in the air-conditioning apparatus for a vehicle in FIG. 1.
Figure 7:
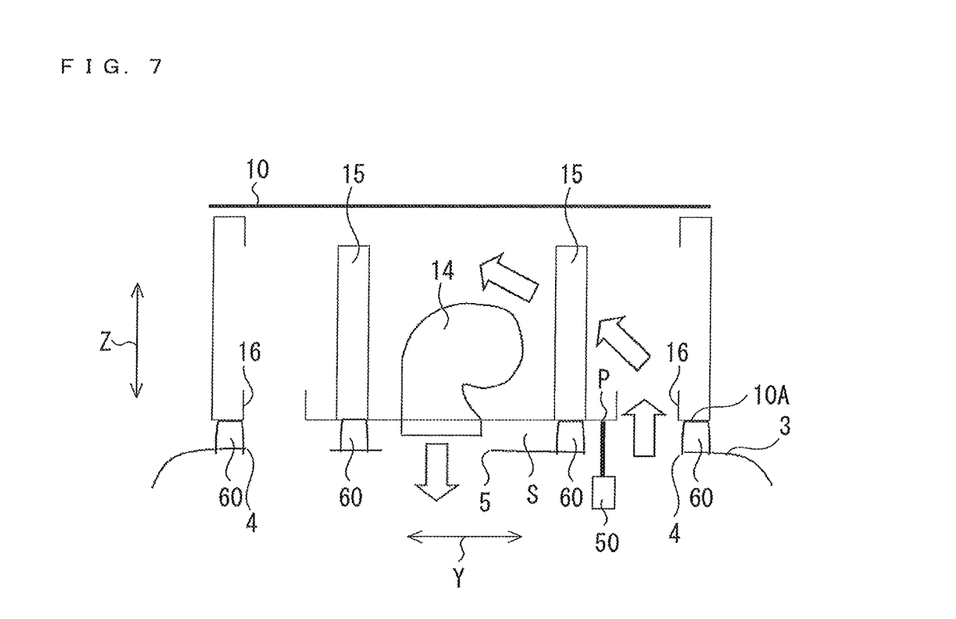
FIG. 7 is a schematic cross-sectional view taken along a Y-Z plane to exemplarily illustrate an indoor blower in the air-conditioning apparatus for a vehicle in FIG. 1.

FIG. 3 is a top view exemplarily illustrating the air-conditioning apparatus for a vehicle in FIG. 1. FIG. 4 is a bottom view exemplarily illustrating the air-conditioning apparatus for a vehicle in FIG. 1. FIG. 5 is a schematic cross-sectional view taken along an X-Z plane to exemplarily illustrate the air-conditioning apparatus for a vehicle in FIG. 1. FIG. 6 is a schematic cross-sectional view taken along a Y-Z plane to exemplarily illustrate a compressor in the air-conditioning apparatus for a vehicle in FIG. 1. FIG. 7 is a schematic cross-sectional view taken along a Y-Z plane to exemplarily illustrate an indoor blower in the air-conditioning apparatus for a vehicle in FIG. 1. The air-conditioning apparatus 1 for a vehicle has the casing 10 in which air inlets 16 for sucking air in the vehicle 2 are formed, and an apparatus main body 1A which is installed in the casing 10 and conditions the air, in the vehicle 2, which is sucked through the air inlets 16. Moreover, as illustrated in FIG. 7, openings 4 communicating with the inside of the vehicle 2 are formed in the roof 3 of the vehicle 2. The air inlets 16 are positioned above the openings 4.

The apparatus main body 1A can selectively perform a cooling operation and a heating operation which use a refrigerant circuit. The apparatus main body 1A includes, as component devices, compressors 11, outdoor heat exchangers (heat source-side heat exchangers) 12, an outdoor blower 13, indoor heat exchangers (use-side heat exchangers) 14, an indoor blower 15. Notably, the casing 10 has partitioning walls 10B which separate the compressor 11, the outdoor blower 13 and the indoor blower 15 from one another. The compressor 11, the outdoor blower 13 and the indoor blower 15 are arranged to be separated from one another in the casing 10.

The compressor 11 sucks and compresses refrigerant. The outdoor heat exchanger 12 exchanges heat between the refrigerant discharged from the compressor 11 and the open air blown from the outdoor blower 13. The indoor heat exchanger 14 exchanges heat between the air, in the vehicle 2, taken in by the indoor blower 15 and the refrigerant. Notably, sealing packings 60 are provided between the roof 3 and the casing 10 to prevent rain water and the like from entering a space S between the roof 3 and the casing 10.

Herein, a flow of the refrigerant in the cooling operation as an example of operation of the apparatus main body 1A is described. First, the refrigerant is brought to high temperature and high pressure in the compressor 11 and flows into the outdoor heat exchanger 12. The refrigerant flowing into the outdoor heat exchanger 12 undergoes heat exchange with the open air taken in by the outdoor blower 13 to be condensed and liquefied. Then, the condensed and liquefied refrigerant flows into the indoor heat exchanger 14. The refrigerant flowing into the indoor heat exchanger 14 is brought to reduced pressure by a not-shown expansion valve and changed into refrigerant in a low-pressure two-phase state. After that, the refrigerant undergoes heat exchange with the air in the vehicle 2 in the indoor heat exchanger 14 to be evaporated and gasified. Then, the air after the heat exchange blows into the vehicle 2 from an air outlet 5 of the vehicle 2 to cool the air in the vehicle 2. After that, the evaporated and gasified refrigerant is sucked again into the compressor 11 from the indoor heat exchanger 14.

To the apparatus main body 1A including the above-mentioned compressor 11, outdoor blower 13, indoor blower 15 and the like, a wiring cable 40 is connected for supplying driving power and sending and receiving control signals for controlling their operation thereto/therefrom. The wiring cable 40 is passed from the component devices of the apparatus main body 1A through wiring through holes 31 to 34 formed in the bottom plate 10A, and is passed to the opening 4 of the vehicle 2 at a position P in the space S between the roof 3 and the bottom plate 10A (on the backside of the bottom plate 10A).

Specifically, in the bottom plate 10A of the casing 10, the wiring through holes 31 to 34 are formed for passing the wiring cable 40 extending from the apparatus main body 1A to the space S between the roof 3 and the casing 10 of the vehicle 2. Here, it is preferable that the wiring through holes 31 to 34 are provided in the bottom plate 10A of the casing 10 respectively for the compressor 11, the outdoor blower 13, the indoor blower 15 and the distribution box 20, and are formed near the positions where the compressor 11, the outdoor blower 13, the indoor blower 15 and the distribution box 20 are disposed. By doing so, the length of the wiring inside the casing 10 can be suppressed to be at its minimum.

The wiring cable 40 passed through the wiring through holes 31 to 34 from the respective component devices of the apparatus main body 1A is routed to the position P above the opening 4 in the space S between the bottom plate 10A and the roof 3 of the vehicle 2. Herein, since it is routed in the space S interposed between the sealing packings 60, inconvenience caused by rain water or the like can be prevented from occurring. The position P above the opening 4 is a position that is above the opening 4 of the vehicle 2 and on the outer peripheral side of the air inlet 16, that is, a position where the wiring cable 40 is dropped in the opening 4 not through the air inlet 16. A connecting connector 50 is fixed to the end part of the wiring cable 40, which is to be connected to electric wiring on the vehicle 2 side via the connecting connector 50.

Figure 8:
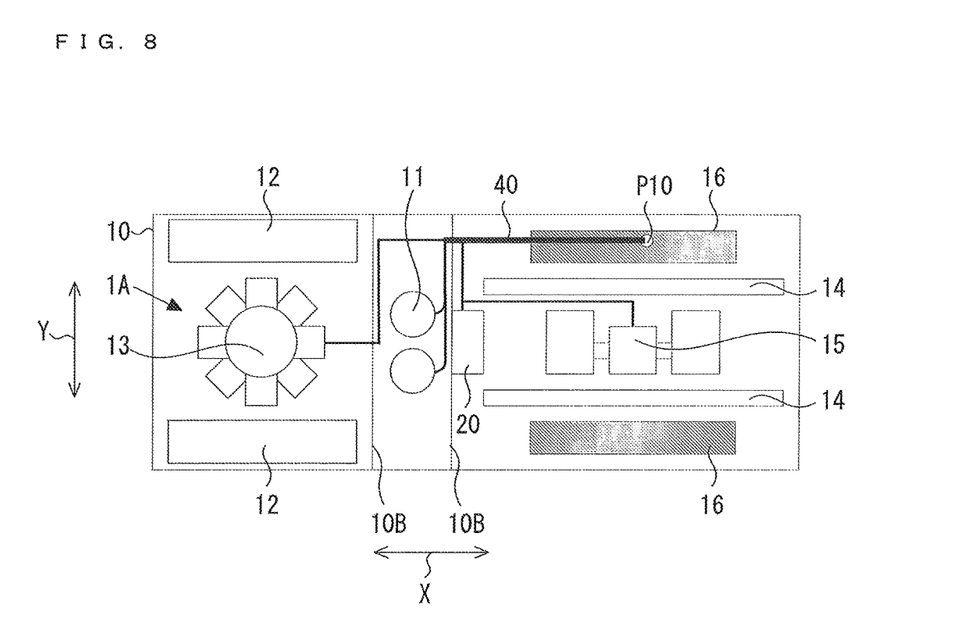
FIG. 8 is a top plan view exemplarily illustrating a conventional air-conditioning apparatus for a vehicle.
Figure 9:
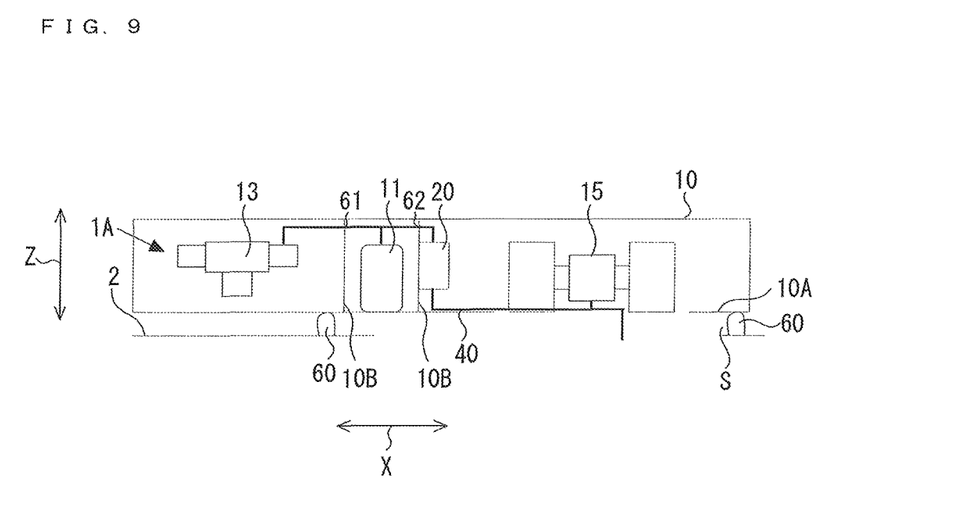
FIG. 9 is a schematic cross-sectional view taken along an X-Z plane to exemplarily illustrate the conventional air-conditioning apparatus for a vehicle.
Figure 10:
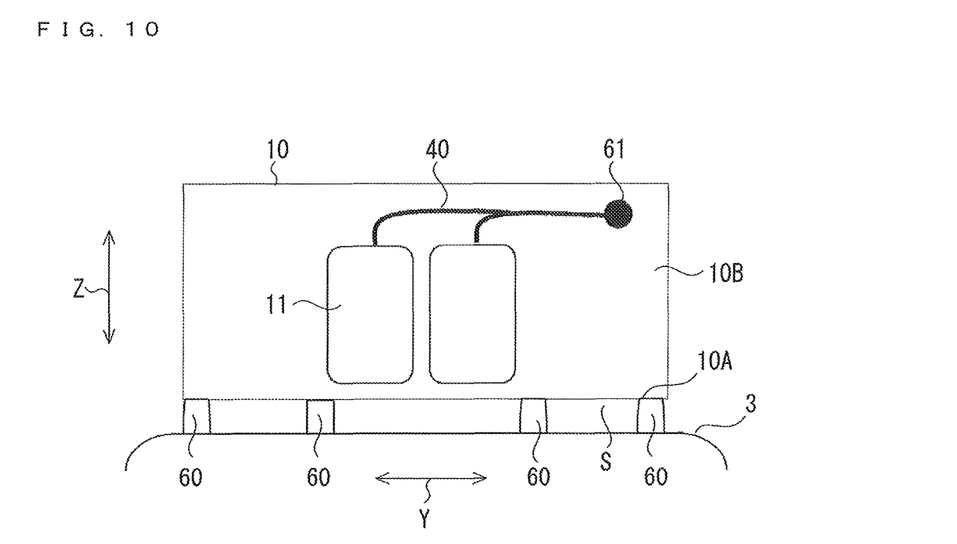
FIG. 10 is a schematic cross-sectional view taken along a Y-Z plane to exemplarily illustrate a compressor in the conventional air-conditioning apparatus for a vehicle.
Figure 11:
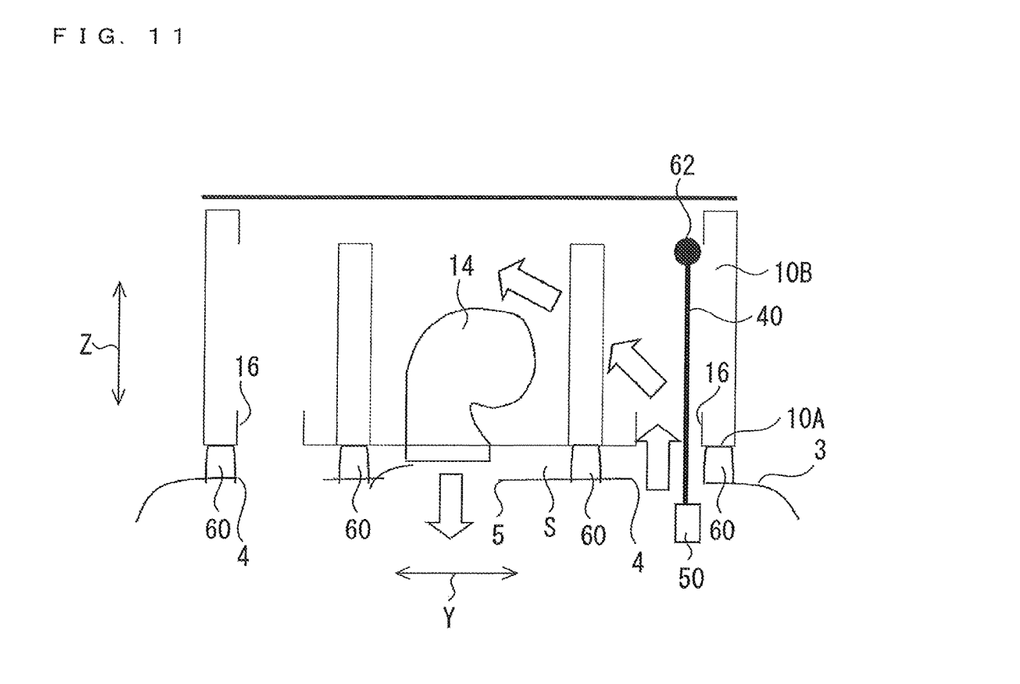
FIG. 11 is a schematic cross-sectional view taken along a Y-Z plane to exemplarily illustrate an indoor blower in the conventional air-conditioning apparatus for a vehicle.

In this way, the wiring cable 40 is disposed between the casing 10 and the roof 3 of the vehicle 2, and thereby, workability of assembly operation and cleaning operation caused by passing the wiring cable 40 through the ventilation path can be improved. Specifically, FIG. 8 is a top plan view exemplarily illustrating a conventional air-conditioning apparatus for a vehicle. FIG. 9 is a schematic cross-sectional view taken along an X-Z plane to exemplarily illustrate the conventional air-conditioning apparatus for a vehicle. FIG. 10 is a schematic cross-sectional view taken along a Y-Z plane to exemplarily illustrate a compressor in the conventional air-conditioning apparatus for a vehicle. FIG. 11 is a schematic cross-sectional view taken along a Y-Z plane to exemplarily illustrate an indoor blower in the conventional air-conditioning apparatus for a vehicle. As illustrated in FIG. 8 to FIG. 11, in the conventional air-conditioning apparatus for a vehicle, the wiring cable 40 extends to the indoor blower 15 side from the compressor 11 and the outdoor blower 13 via holes 61 and 62 provided on the partitioning walls 10B in the casing 10. The wiring cable 40 extending from the compressor 11, the outdoor blower 13, the indoor blower 15 and the distribution box 20 is routed in the casing 10 and dropped at a position P10 in the air inlet 16. Such a case causes an increase of ventilation resistance due to the wiring cable 40. Further, since the wiring cable 40 is needed to be laid in the casing 10, it causes an obstacle, for example, in cleaning or inspection operation of the indoor heat exchanger 14. Moreover, when the wiring is laid in the limited space, workability of assembly is problematically poor. Furthermore, since a space for passing the wiring in the air-conditioning apparatus is needed, this problematically causes the dimensions of the air-conditioning apparatus to be large.

Therefore, as illustrated in FIG. 3 to FIG. 7, the wiring through holes 31 to 34 for passing the wiring cable 40 extending from the apparatus main body 1A (the compressor 11, the outdoor blower 13, the indoor blower 15 and the distribution box 20) through the space between the roof 3 and the bottom plate 10A are provided in the bottom plate 10A. Further, the wiring cable 40 extends from the backside of the bottom plate 10A to the opening 4 of the vehicle 2 at the position P above the opening 4, of the roof 3, which communicates with the air inlet 16. Notably, there may be adopted a configuration in which a wiring through hole is formed also at the position P and the wiring extends through this wiring through hole into the casing 10. By doing so, since the wiring cable 40 does not pass through the air inlet 16, an increase of ventilation resistance due to the wiring cable 40 can be prevented. Moreover, the wiring cable 40 is laid in the space between the roof 3 and the casing 10, and thereby, there is not needed a space for laying the wiring cable 40 inside the casing 10, which can improve operation efficiency and can attain small dimensions.

Embodiment 2

Figure 12:
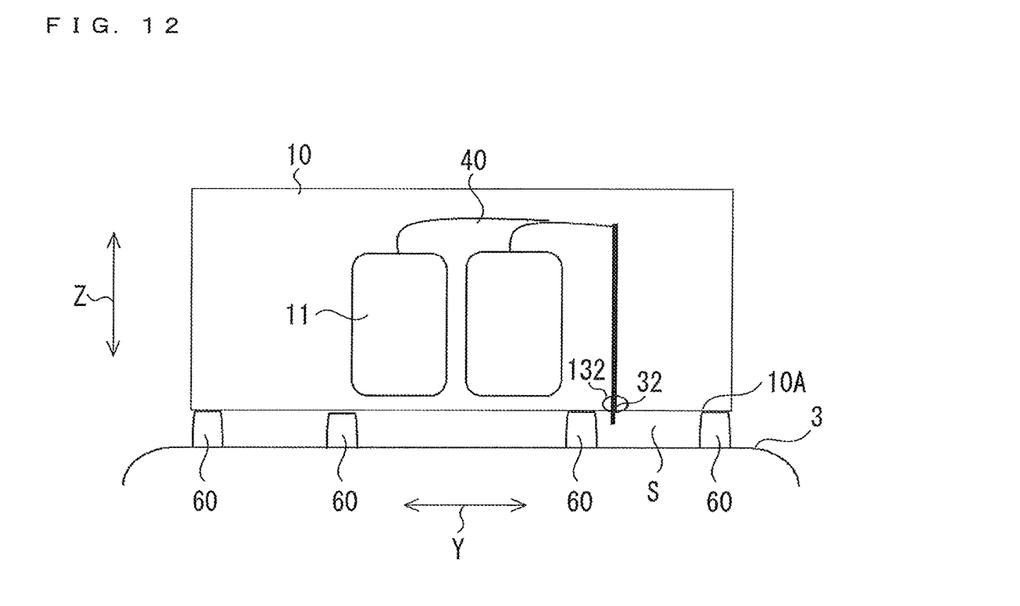
FIG. 12 is a schematic diagram illustrating Embodiment 2 of the wiring through hole in the air-conditioning apparatus for a vehicle of the present invention.
Figure 13:
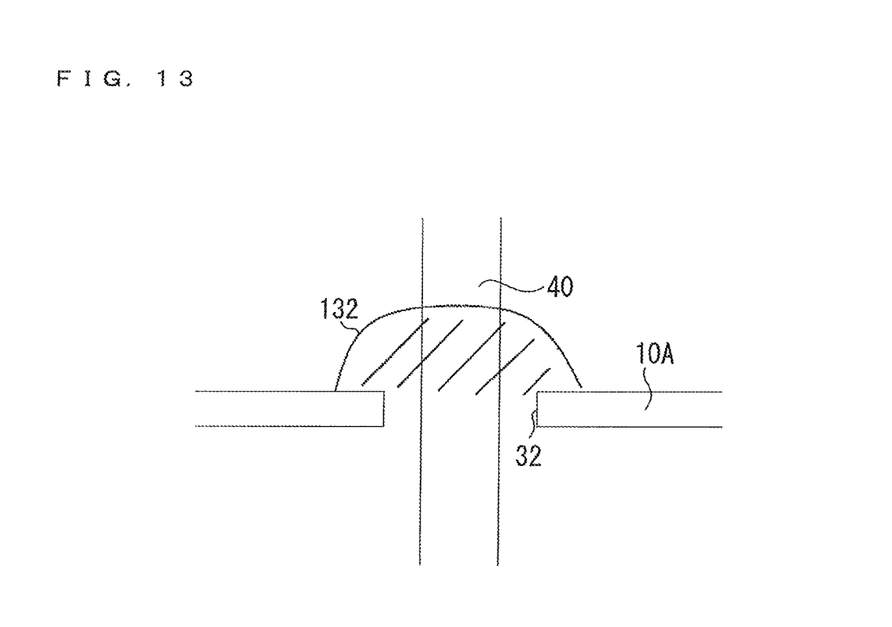
FIG. 13 is a schematic diagram illustrating Embodiment 2 of the wiring through hole in the air-conditioning apparatus for a vehicle of the present invention.

FIG. 12 and FIG. 13 are schematic diagrams illustrating Embodiment 2 of the wiring through hole in the air-conditioning apparatus for a vehicle of the present invention. Notably, in the air-conditioning apparatus for a vehicle in FIG. 12 and FIG. 13, the portions having the same configurations as those of the air-conditioning apparatus for a vehicle in FIG. 3 to FIG. 7 are given the same signs, and the description of those configurations is omitted. Moreover, in FIG. 12 and FIG. 13, while the wiring through hole 32 corresponding to the compressor 11 is exemplarily described, the same can apply to the other wiring through holes 31, 33 and 34. The difference of the wiring through hole 32 in FIG. 12 and FIG. 13 from the wiring through hole 32 in FIG. 3 to FIG. 7 is in that a sealing member 132 is provided in the wiring through hole 32.

Specifically, as illustrated in FIG. 11, the sealing member 132 such as putty for filling a gap between the wiring through hole 32 and the wiring cable 40 is provided. By doing so, even when the refrigerant leaks from the compressor 11, the refrigerant can be prevented from flowing into the vehicle through the wiring through hole 32. Furthermore, bypass air through the wiring through hole 32 can be shut off. Moreover, even for the air-conditioning apparatus for a vehicle in FIG. 12 and FIG. 13, operation efficiency can be improved and the apparatus can be made small in size.

Embodiment 3

Figure 14:
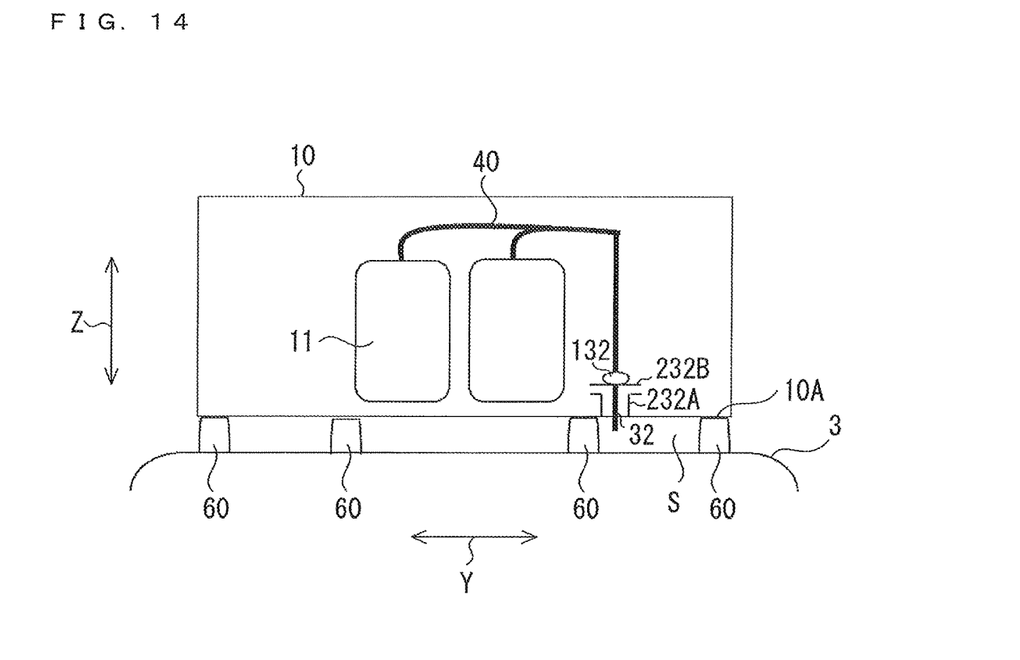
FIG. 14 is a schematic diagram illustrating Embodiment 3 of the wiring through hole in the air-conditioning apparatus for a vehicle of the present invention.
Figure 15:
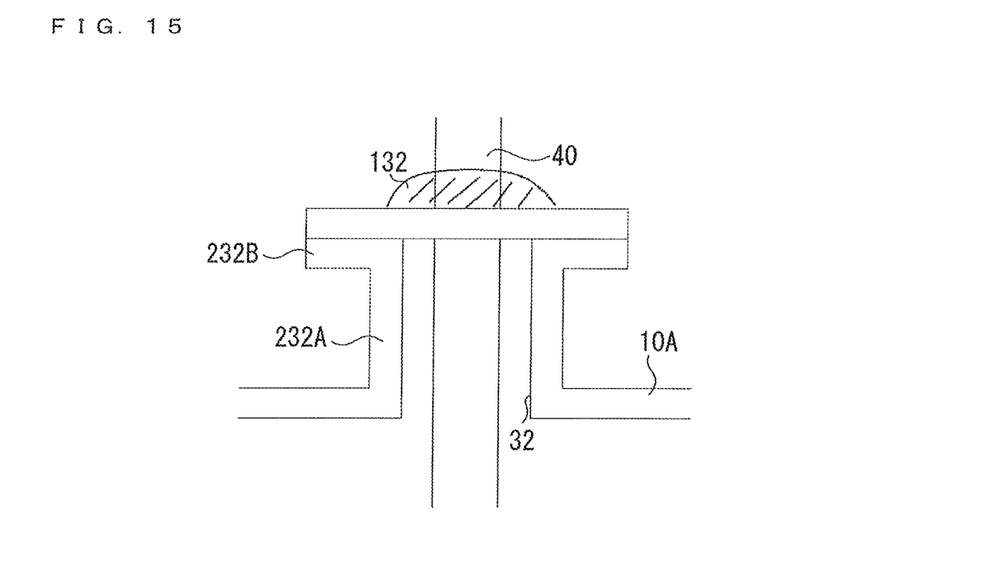
FIG. 15 is a schematic diagram illustrating Embodiment 3 of the wiring through hole in the air-conditioning apparatus for a vehicle of the present invention.

FIG. 14 and FIG. 15 are schematic diagrams illustrating Embodiment 3 of the wiring through hole in the air-conditioning apparatus for a vehicle of the present invention. Notably, in the wiring through hole in FIG. 14 and FIG. 15, the portions having the same configurations as those of the wiring through hole in FIG. 3 to FIG. 13 are given the same signs, and the description of those configurations is omitted. Moreover, in FIG. 14 and FIG. 15, while the wiring through hole 32 corresponding to the compressor 11 is exemplarily described, the same can apply to the other wiring through holes 31, 33 and 34. The difference of the wiring through hole 32 in FIG. 14 and FIG. 15 from the wiring through hole 32 in FIG. 3 to FIG. 13 is in that a barrier part 232A is provided.

Specifically, as illustrated in FIG. 14 and FIG. 15, the barrier part 232A protruding inward of the casing 10 is formed on an edge part of the wiring through hole 32. A lid 232B closing the barrier part 232A is fixed to the upper part of the barrier part 232A. Furthermore, the sealing member 132 is provided in the portion, in the lid 232B, that the wiring cable 40 penetrates. Even when drain water flows on the bottom plate 10A, the barrier part 232A can prevent the drain water from leaking to the outside through the wiring through hole 32. Furthermore, even when the refrigerant leaks from the compressor 11, the refrigerant can be prevented from flowing into the vehicle through the wiring through hole 32. Furthermore, bypass air through the wiring through hole 32 can be shut off. Moreover, even for the air-conditioning apparatus for a vehicle in FIG. 14 and FIG. 15, operation efficiency can be improved and the apparatus can be made small in size.

Embodiment 4

Figure 16:
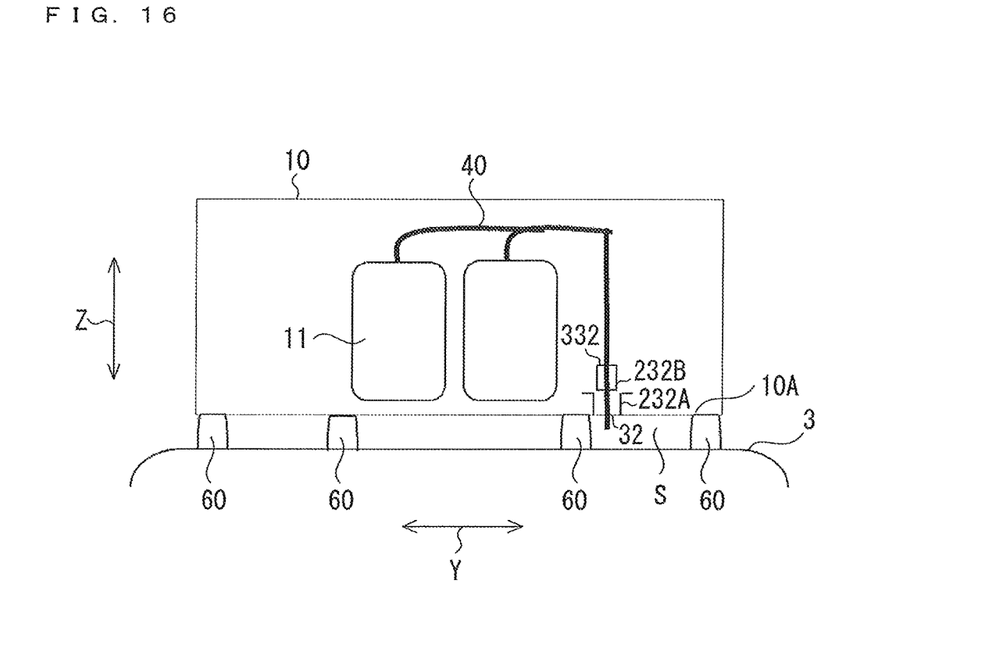
FIG. 16 is a schematic diagram illustrating Embodiment 4 of the wiring through hole in the air-conditioning apparatus for a vehicle of the present invention.
Figure 17:
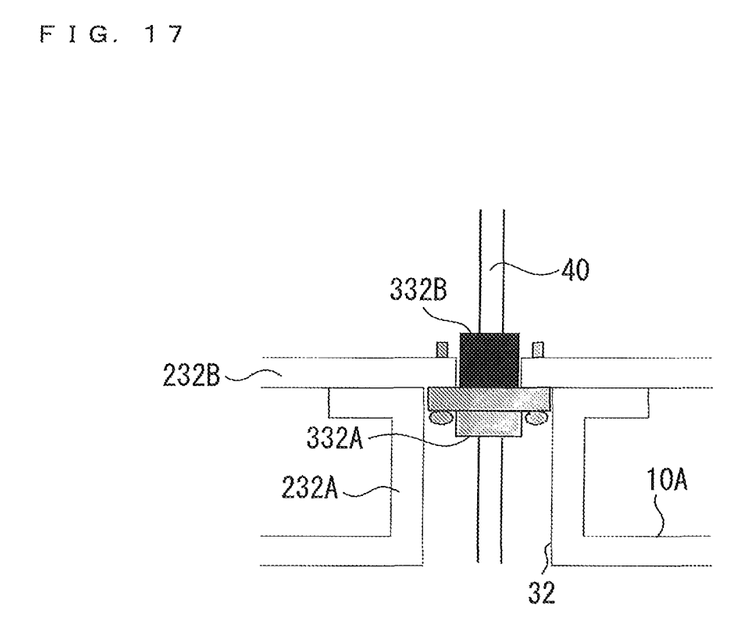
FIG. 17 is a schematic diagram illustrating Embodiment 4 of the wiring through hole in the air-conditioning apparatus for a vehicle of the present invention.

FIG. 16 and FIG. 17 are schematic diagrams illustrating Embodiment 4 of the wiring through hole in the air-conditioning apparatus for a vehicle of the present invention. Notably, in the wiring through hole 32 in FIG. 16 and FIG. 17, the portions having the same configurations as those of the wiring through hole 32 in FIG. 3 to FIG. 15 are given the same signs, and the description of those configurations is omitted. Moreover, in FIG. 16 and FIG. 17, while the wiring through hole 32 corresponding to the compressor 11 is exemplarily described, the same can apply to the other wiring through holes 31, 33 and 34. The difference of the wiring through hole 32 in FIG. 16 and FIG. 17 from the wiring through hole 32 in FIG. 3 to FIG. 15 is in that the wiring cable 40 is connected with a first relay connector 332A and a second relay connector 332B in the wiring through hole 32.

Specifically, as illustrated in FIG. 16 and FIG. 17, the first relay connector 332A connected to the tip of the wiring cable 40 that is disposed between the bottom plate 10A and the roof 3 is fixed to the wiring through hole 32. Meanwhile, the second relay connector 332B which is to be connected to the first relay connector 332A is fixed to the tip of the wiring cable 40 that is inside the casing 10. Notably, the wiring cable 40 to the first relay connector 332A from the vehicle 2 side is disposed in advance. Therefore, in performing wiring operation in the casing 10, an operator can complete the wiring operation only by connecting the second relay connector 332B extending from the component devices of the apparatus main body 1A to the first relay connector 332A on the bottom plate 10A.

By doing so, even when the wiring cable 40 is laid between the bottom plate 10A and the roof 3, attachment and detachment between the wiring and the components of the apparatus main body 1A can be performed with ease. Hence, wiring operation and assembly operation can be efficiently performed. Furthermore, even when drain water flows on the bottom plate 10A, the barrier part 232A can prevent the drain water from leaking to the outside through the wiring through hole 32. Moreover, even when the refrigerant leaks from the compressor 11, the refrigerant can be prevented from flowing into the vehicle through the wiring through hole 32. Furthermore, bypass air through the wiring through hole 32 can be shut off. Moreover, even for the air-conditioning apparatus for a vehicle in FIG. 16 and FIG. 17, operation efficiency can be improved and the apparatus can be made small in size.

Embodiments of the present invention are not limited to the above-mentioned embodiments. For example, in Embodiments 1 to 4, while the outdoor blower 13, the indoor blower 15 and the distribution box 20 are exemplarily presented as component devices of the apparatus main body 1A which are connected to the wiring cable 40, the same can apply to devices which require power supply or devices which require control, the devices contained in the casing 10. Moreover, while the case where the wiring through holes 31 to 34 are provided respectively for the component devices of the apparatus main body 1A (the compressor 11, the outdoor blower 13, the indoor blower 15 and the distribution box 20) is exemplarily presented, for example, one wiring through hole 33 may be provided for a plurality of component devices (the indoor blower 15 and the distribution box 20).

| Reference Signs List | |
|---|---|
| 1 air-conditioning apparatus for a vehicle | 1A apparatus main body |
| 2 vehicle | 3 roof |
| 4 opening | 5 air outlet |
| 10 casing | 10A bottom plate |
| 10B partitioning wall | 11 compressor |
| 12 outdoor heat exchanger | 13 outdoor blower |
| 14 indoor heat exchanger | 15 indoor blower |
| 16 air inlet | 20 distribution box |
| 31, 32, 33, 34 wiring through hole | 40 wiring cable |
| 50 connecting connector | 60 sealing packing |
| 61, 62 hole | 132 sealing member |
| 232A barrier part | 232B lid |
| 332A first relay connector | 332B second relay connector |
| P position | S space |

The invention claimed is:

1. An air-conditioning apparatus for a vehicle, comprising:
a casing provided on a roof of a vehicle and formed with an air inlet through which air in the vehicle is sucked from an air communication opening formed in the roof of the vehicle; and
an apparatus main body installed in the casing for conditioning the air of the vehicle, that is sucked through the air inlet wherein the apparatus main body includes a compressor, and at least one blower, wherein
a plurality of wiring through holes for passing a plurality of wiring cables including power cables and control cables extending from the apparatus main body through a space between the roof of the vehicle and the casing is formed in a bottom plate of the casing wherein a respective wiring through hole of the plurality of wiring through holes corresponds to a wiring cable of each of the compressor, and the at least one blower, provided in the bottom plate of the casing, and
the wiring cables are disposed so as to be passed through the space between the bottom plate of the casing and the roof of the vehicle via the respective wiring through holes from the apparatus main body and to extend into a single opening in the roof of the vehicle wherein the opening is separate from the air communication opening formed in a roof of the vehicle wherein the casing includes a wall protruding inward of the casing on an edge part of each wiring through hole, and a lid fixed on an upper part of the inwardly protruding wall, wherein
a first relay connector connected to a tip of the wiring cable and disposed between the bottom plate and the roof is fixed to the wiring through hole within the wall protruding inward and below the lid, and
a second relay connector configured to be connected to the first relay connector is fixed to a tip of the wiring cable inside of the casing and at least partially above the lid.

2. The air-conditioning apparatus for a vehicle of claim 1, wherein
the apparatus main body includes a power distribution box, and the at least one blower includes an indoor blower and an outdoor blower;
a respective wiring through hole of the plurality of wiring through holes corresponds to each of the indoor blower, the outdoor blower, and the power distribution box, provided in the bottom plate of the casing.

3. The air-conditioning apparatus for a vehicle of claim 1, wherein a through hole sealing member for filling a gap between the wiring through hole and the wiring cable is provided in each wiring through hole.

4. The air-conditioning apparatus for a vehicle of claim 1, wherein each wiring cable comprises:
a driving power line; and
a control signal line.

* * * * *